United States Patent [19]
Rochberger et al.

[11] Patent Number: 6,147,971
[45] Date of Patent: Nov. 14, 2000

[54] OPTIMIZED ROUTING METHOD BASED ON MINIMAL HOP COUNT FOR USE IN PNNI BASED ASYNCHRONOUS TRANSFER MODE NETWORKS

[75] Inventors: Haim Rochberger, Netanya; Alexander Or, Nesher, both of Israel

[73] Assignee: 3Com Corporation, Santa Clara, Calif.

[21] Appl. No.: 09/195,342

[22] Filed: Nov. 18, 1998

[51] Int. Cl.$^7$ .................................................. H04L 12/28
[52] U.S. Cl. ............................................ 370/238; 370/255
[58] Field of Search .................................... 370/238, 254, 370/255, 351, 395, 396, 252, 256, 400, 392; 709/241, 242

[56] References Cited

U.S. PATENT DOCUMENTS

| | | |
|---|---|---|
| 5,117,422 | 5/1992 | Hauptschein et al. . |
| 5,323,394 | 6/1994 | Perlman . |
| 5,491,690 | 2/1996 | Alfonsi et al. . |
| 5,535,195 | 7/1996 | Lee . |
| 5,600,638 | 2/1997 | Bertin et al. . |
| 5,699,347 | 12/1997 | Callon ........................................ 370/238 |
| 5,781,529 | 7/1998 | Liang et al. .............................. 370/218 |
| 5,805,593 | 8/1998 | Busche .................................... 370/296 |
| 5,831,982 | 11/1998 | Hummel ................................. 370/396 |

*Primary Examiner*—Dang Ton
*Assistant Examiner*—Ken Vanderpuye
*Attorney, Agent, or Firm*—Howard Zaretsky; David J. Weitz; Wilson Sonsini Goodrich & Rosati

[57] ABSTRACT

Two solutions are provided for optimizing the algorithm used by the local node in calculating the route to a destination node. A first method optimizes the route calculation by associating a port/link information with the PTSEs received by the node. The association is made using the first PTSE to arrive from an originating node. The routing algorithm is then steered to begin routing to a destination using the associated port/link. A second method optimizes the route calculation by utilizing a special PTSE termed a ROUTE_PTSE into which is placed the route the PTSE takes upon being flooded from the creating node to the local node. When routing, the local node traverses the DTL already existing in the ROUTE_PTSE received from a particular originating node that is the current destination node.

6 Claims, 9 Drawing Sheets

OPTIMIZED ROUTING METHOD BASED ON MINIMAL HOP COUNT FOR USE IN PNNI BASED ASYNCHRONOUS TRANSFER MODE NETWORKS

FIELD OF THE INVENTION

The present invention relates generally to data communication networks and more particularly relates to a method of improving the performance of routing algorithms used in PNNI based ATM networks based on optimizing on minimal hop count.

BACKGROUND OF THE INVENTION

Currently, there is a growing trend to make Asynchronous Transfer Mode (ATM) networking technology the base of future global communications. ATM has already been adopted as a standard for broadband communications by the International Telecommunications Union (ITU) and by the ATM Forum, a networking industry consortium.

Asynchronous Transfer Mode

ATM originated as a telecommunication concept defined by the Comite Consulatif International Telegraphique et Telephonique (CCITT), now known as the ITU, and the American National Standards Institute (ANSI) for carrying user traffic on any User to Network Interface (UNI) and to facilitate multimedia networking between high speed devices at multi-megabit data rates. ATM is a method for transferring network traffic, including voice, video and data, at high speed. Using this connection oriented switched networking technology centered around a switch, a great number of virtual connections can be supported by multiple applications through the same physical connection. The switching technology enables bandwidth to be dedicated for each application, overcoming the problems that exist in a shared media networking technology, like Ethernet, Token Ring and Fiber Distributed Data Interface (FDDI). ATM allows different types of physical layer technology to share the same higher layer—the ATM layer.

ATM uses very short, fixed length packets called cells. The first five bytes, called the header, of each cell contain the information necessary to deliver the cell to its destination. The cell header also provides the network with the ability to implement congestion control and traffic management mechanisms. The fixed length cells offer -smaller and more predictable switching delays as cell switching is less complex than variable length packet switching and can be accomplished in hardware for many cells in parallel. The cell format also allows for multi-protocol transmissions. Since ATM is protocol transparent, the various protocols can be transported at the same time. With ATM, phone, fax, video, data and other information can be transported simultaneously.

ATM is a connection oriented transport service. To access the ATM network, a station requests a virtual circuit between itself and other end stations, using the signaling protocol to the ATM switch. ATM provides the User Network Interface (UNI) which is typically used to interconnect an ATM user with an ATM switch that is managed as part of the same network.

The current standard solution for routing in a private ATM network is described in Private Network Node Interface (PNNI) Phase 0 and Phase 1 specifications published by ATM Forum. The previous Phase 0 draft specification is referred to as Interim Inter-Switch Signaling Protocol (IISP). The goal of the PNNI specifications is to provide customers of ATM network equipment some level of multi-vendor interoperability.

The Interim Local Management Interface (ILMI) for the PNNI protocol specification provides an auto-port configuration capability. This capability functions to minimize manual configuration operations for PNNI ports of switches. The Phase 0 solution to auto-port configuration is based on hop by hop routing utilizing a 'best match' scheme. The Phase 1 PNNI based solution is based on Open Shortest Path First (OSPF) with the additions necessary for ATM. This scheme is essentially a 'source routing' scheme whereby each node has basic knowledge of the structure of the entire network and uses this knowledge to build a complete path from the source to the destination. When a connection is to be set up from a source to a destination, the source sends out a SETUP message that has within it the address of the destination. Each ATM network node along the way reads the next node from the SETUP message and forwards the message to an appropriate next node. This continues until the SETUP message arrives at its destination.

In the IISP Phase 0 specification standard, the ATM nodes in the network route the signaling SETUP message hop by hop (i.e., node by node) using a 'best match' scheme. ATM addresses are 20 bytes long but only 19 bytes can be used for routing purposes. According to the IISP Phase 0 standard, several prefixes of the ATM address for each link can be registered.

When a node (i.e., an ATM switch) needs to decide to which particular node to route the received SETUP message to, it compares the destination address with all the registered addresses for all of its ports. Only if an address prefix is found that fully matches the destination address can the destination address be considered for routing. After all the prefixes are compared, the prefix address that is the longest is used to determine the routing of the SETUP message. It is important to note that the standard does not require the transfer of any routing information between two neighboring nodes. In addition, the standard also does not permit the use of a TRANSIT NET ID parameter during the signaling phase, which can be used to route to a different routing domain.

A disadvantage of this scheme is that all the prefixes of all neighboring nodes must be registered manually on each of the respective ports. For example, if a port is disconnected from a neighbor and connected to a new neighbor, then the registered addresses must be manually changed in both nodes. This type of network can be termed an absolutely static network.

PNNI Phase 1

As part of the ongoing enhancement to the ATM standard by work within the ATM Forum and other groups, the Private Network to Network Interface (PNNI) protocol Phase 1 has been developed for use between private ATM switches and between groups of private ATM switches. The PNNI specification includes two categories of protocols. The first protocol is defined for the distribution of topology information between switches and clusters of switches where the information is used to compute routing paths within the network. The main feature of the PNNI hierarchy mechanism is its ability to automatically configure itself within the networks in which the address structure reflects the topology. The PNNI topology and routing techniques are based on the well known link state routing technique.

The second protocol is effective for signaling, i.e., the message flows used to establish point-to-point and point-tomultipoint connections across the ATM network. This protocol is based on the ATM Forum User to Network Interface (UNI) signaling with mechanisms added to support source routing, crankback and alternate routing of source SETUP requests in the case of bad connections With reference to the PNNI Phase 1 specifications, the PNNI hierarchy begins at the lowest level where the lowest level nodes are organized into peer groups. A logical node in the context of the lowest hierarchy level is the lowest level node. A logical node is typically denoted as simply a node. A peer group is a collection of logical nodes wherein each node within the group exchanges information with the other members of the group such that all members maintain an identical view of the group. When a logical length becomes operational, the nodes attached to it initiate and exchange information via a well known Virtual Channel Connection (VCC) used as a PNNI Routing Control Channel (RCC).

Hello messages are sent periodically by each node on this link. In this fashion the Hello protocol makes the two neighboring nodes known to each other. Each node exchanges Hello packets with its immediate neighbors to determine its neighbor's local state information. The state information includes the identity and peer group membership of the node's immediate neighbors and a status of its links to its neighbors. Each node then bundles its state information in one or more PNNI Topology State Elements (PTSEs) which are subsequently flooded throughout the peer group.

PTSEs are the smallest collection of PNNI routing information that is flooded as a unit among all logical nodes within a peer group. A node topology database consists of a collection of all PTSEs received, which represent that particular node's present view of the PNNI routing topology. In particular, the topology database provides all the information required to compute a route from the given source node to any destination address reachable in or through that routing domain.

When neighboring nodes at either end of a logical length begin initializing through the exchange of Hellos, they may conclude that they are in the same peer group. If it is concluded that they are in the same peer group, they proceed to synchronize their topology databases. Database synchronization includes the exchange of information between neighboring nodes resulting in the two nodes having identical topology databases. A topology database includes detailed topology information about the peer group in which the logical node resides in addition to more abstract topology information representing the remainder of the PNNI routing domain.

During a topology database synchronization, the nodes in question first exchange PTSE header information, i.e., they advertise the presence of PTSEs in their respective topology databases. When a node receives PTSE header information that advertises a more recent PTSE version than the one that it has already or advertises a PTSE that it does not yet have, it requests the advertised PTSE and updates its topology database with the subsequently received PTSE. If the newly initialized node connects to a peer group then the ensuing database synchronization reduces to a one way topology database copy. A link is advertised by a PTSE transmission only after the database synchronization between the respective neighboring nodes has successfully completed. In this fashion, the link state parameters are. distributed to all topology databases in the peer group.

Flooding is the mechanism used for advertising links whereby PTSEs are reliably propagated node by node throughout a peer group. Flooding ensures that all nodes in a peer group maintain identical topology databases. A short description of the flooding procedure follows. PTSEs are encapsulated within PNNI Topology State Packets (PTSPs) for transmission. When a PTSP is received its component PTSEs are examined. Each PTSE is acknowledged by encapsulating information from its PTSE header within the acknowledgment packet that is sent back to the sending neighbor If the PTSE is new or of more recent origin then the node's current copy, the PTSE is installed in the topology database and flooded to all neighboring nodes except the one from which the PTSE was received. A PTSE sent to a neighbor is periodically retransmitted until acknowledged, Note that flooding is an ongoing activity wherein each node issues PTSPs with PTSEs that contain updated information. The PTSEs contain the topology databases and are subject to aging and get removed after a predefined duration if they are not refreshed by a new incoming PTSE. Only the node that originally originated a particular PTSE can re-originate that PTSE. PTSEs are reissued both periodically and on an event driven basis.

As described previously, when a node first learns about the existence of a neighboring peer node which resides in the same peer group, it initiates the database exchange process in order to synchronize its topology database with that of its neighbor's. The database exchange process involves exchanging a sequence of database summary packets that contain the identifying information of all PTSEs in a node topology database. The database summary packet performs an exchange utilizing a lock step mechanism whereby one side sends a database summary packet and the other side responds with its own database summary packet, thus acknowledging the received packet.

When a node receives a database summary packet from its neighboring peer, it first examines its topology database for the presence of each PTSE described within the packet. If the particular PTSE is not found in its topology database or if the neighboring peer has a more recent version of the PTSE then the node requests the PTSE from the particular neighboring peer or optionally from another neighboring peer whose database summary indicates that it has the most recent version of the PTSE.

A corresponding neighboring peer data structure is maintained by the nodes located on either side of the link. The neighboring peer data structure includes information required to maintain database synchronization and flooding to neighboring peers.

It is assumed that both nodes on either side of the link begin in the Neighboring Peer Down state. This is the initial state of the neighboring peer for this particular state machine. This state indicates that there are no active links through the neighboring peer. In this state, there are no adjacencies associated with the neighboring peer either. When the link-reaches the point in the Hello protocol where both nodes are able to communicate with each other, the event AddPort is triggered in the corresponding neighboring peer state machine. Similarly when a link falls out of communication with both nodes the event DropPort is triggered in the corresponding neighboring peering state machine. The database exchange process commences with the event AddPort that is thus triggered but only after the first link between the two neighboring peers is up. When the DropPort event for the last link between the neighboring peers occurs, the neighboring peer state machine will internally generate the DropPort last event closing all state information for the neighboring peers to be cleared.

It is while in the Negotiating state that the fast step is taken in creating an adjacency between two neighboring peer nodes. During this step it is decided which node is the master, which is the slave and it is also in this state that an initial Database Summary (DS) sequence number is decided upon. Once the negotiation has been completed, the Exchanging state is entered. In this state the node describes is topology database to the neighboring peer by sending database summary packets to it.

After the peer processes the database summary packets, the missing or updated PTSEs can then be requested. In the Exchanging state the database summary packets contain summaries of the topology state information contained in the node's database. In the case of logical group nodes, those portions of the topology database that where originated or received at the level of the logical group node or at higher levels are included in the database summary. The PTSP and PTSE header information of each such PTSE is listed in one of the nodes database packets. PTSEs for which new instances are received after the exchanging status have been entered may not be included in any database summary packet since they will be handled by the normal flooding procedures.

The incoming data base summary packet on the receive side is associated with a neighboring peer via the interface over which it was received. Each database summary packet has a database summary sequence number that is implicitly acknowledged. For each PTSE listed, the node looks up the PTSE in its database to see whether it also has an instance of that particular PTSE. If it does not or if the database copy is less recent, then the node either re-originates the newer instance of the PTSE or flushes the PTSE from the routing domain after installing it in the topology database with a remaining lifetime set accordingly.

Alternatively, if the listed PTSE has expired, the PTSP and PTSE header contents in the PTSE summary are accepted as a newer or updated PTSE with empty contents. If the PTSE is not found in the node's topology database, the particular PTSE is put on the PTSE request list so it can be requested from a neighboring peer via one or more PTSE request packets.

If the PTSE request list from a node is empty, the database synchronization is considered complete and the node moves to the Full state.

However, if the PTSE request list is not empty then the Loading state is entered once the node's last database summary packet has been sent but the PTSE request list is not empty. At this point, the node now knows which PTSE needs to be requested. The PTSE request list contains a list of those PTSEs that need to be obtained in order to synchronize that particular node's topology database with the neighboring peer's topology database. To request these PTSEs, the node sends the PTSE request packet that contains one or more entries from the PTSE request list. The PTSE request list packets are only sent during the Exchanging state and the Loading state. The node can sent a PTSE request pack to a neighboring peer and optionally to any other neighboring peers that are also in either the Exchanging state or the Loading state and whose database summary indicate that they have the missing PTSEs.

The received PTSE request packets specify a list of PTSEs that the neighboring peer wishes to receive. For each PTSE specified in the PTSE request packet, its instance is looked up in the node's topology database. The requested PTSEs are subsequently bundled into PTSPs and transmitted to the neighboring peer. Once the last PTSE and the PTSE request list has been received, the node moves from the Loading state to the Full state. Once the Full state has been reached, the node has received all PTSEs known to be available from its neighboring peer and links to the neighboring peer can now be advertised within PTSEs.

IISP

IISP is a method of routing and performing auto registration (auto configuration) in an ATM network. The method simplifies the configuration and routing for ATM networks having a relatively large number of nodes. Networks are constructed in hierarchical fashion in the form of branches and trees and assigned network address prefixes in accordance with their location in the network. Network nodes periodically exchange identification information permitting both switches on either side of a link to be aware of who they are connected to. Each node registers a network address and an associated significant length for each of its neighbors on each of its links. A node performs routing by comparing the destination address against each of its registered addresses for all its links. The routing method takes advantage of the network address prefix to ensure that the routing proceeds in the correct direction towards the destination and does not enter a tree or a branch that does not contain the destination. In addition, each node performs load balancing at each point in the routing process. A node can generate crankback messages if the routing leads to a dead end.

In the address prefix exchange method, each node knows who its neighbors are. This is accomplished by each node sending out on all its NNI ports an identification message that comprises the address prefix assigned to it and its significant length. This message is sent out periodically (e.g., every second). The nodes that receive it compare the address prefix in the message to the special NNI type address that is registered on the port the message was received on. If the addresses do not match or there is no NNI address registered, then the node makes the received address prefix the new registered NNI address for that port and changes its routing tables accordingly. If the address do match, the message is ignored.

Each node sending out identification messages on a periodic basis automatically permits the node to almost immediately detect if it becomes connected to a new neighbor. If a change is detected, the nodes modifies its routing tables accordingly. In addition, since each node address prefix is unique and is assigned in hierarchical fashion as described above, it is guaranteed that either the local address prefix (i.e., the address prefix of the node itself) or the remote node address prefix will be smaller.

The IISP signaling specification requires that one side of a link be denoted as the USER and the other side as the NETWORK. In networks constructed in accordance with the present invention, on NNI links, if the significant length of the local prefix (i.e., of the node itself) is shorter than that of a neighbor, then the local side is set as the NETWORK. This particular link attribute setting allows the signaling to automatic align after a dynamic link replacement when a nodes neighbors are changed.

Thus, the automatic exchange of network address prefixes causes the routing tables of each node to be updates and permits the signaling to 'come up'. This is in contrast to IISP Phase 0 which requires that link attributes to be set manually. This method is thus especially advantageous in large networks of more than two nodes As an alternative to the automatic exchange of network addresses, the transfer of addresses can be performed manually at each node or can be performed in accordance with ILMI registration procedures.

Note that the above described PNNI and IISP routing schemes are inherently different. In PNNI only fall address matching is permitted, i e., an address must filly match the address entry in the topology database. In contrast, IISP permits partial address matching. The IISP routing method is a partially static routing scheme.

In addition, there are many ATM switches currently in operation that support only the IISP type routing. It is desirable to permit the owners of many of these older ATM switches to upgrade their switches to the more modem PNNI type routing. Upgrades can be performed by upgrading the operating software within the switches. In order to permit upgraded nodes to operate in a PNNI network, the upgraded switches can only support a minimal PNNI configuration. This means that the hierarchical features of PNNI are not supported. More specifically, in a minimal subset of PNNI, a node cannot function as a border node or as a Peer Group Leader (PGL). A border node is a node that has a link to another peer group and executes a special finite state machine (FSM). The PGL is the node that represents the whole peer group and functions as the key component for building large hierarchical networks.

A conflict exists, however, since a major benefit of PNNI is its ability to permit network designers to construct large hierarchical networks. Using PNNI, networks can be constructed that comprise peer groups having from dozens to over a hundred nodes. The concept is tat many nodes in the same peer group can be represented as one node in a higher level of the hierarchy. Since PNNI utilizes a link state, source routing type routing scheme wherein each node has a view of the entire network, it is the hierarchy that permits the division of the network view into smaller chunks. In PNNI, very large portions of the network comprising a large number of nodes may be viewed by nodes in other peer groups as a single logical node.

Routing in PNNI Networks

Using the Hello protocol and related FSM of PNNI, neighboring nodes learn about each other by transmitting a special Hello message over the link. This is done on a continual periodic basis. When a node generates a new PTSE, the PTSE is flooded to the other nodes within its peer group. This permits each node to maintain an up to date view of the network Additional information on link state routing can be found in Section 9.2 of the book Interconnections: Bridges and Routers by Radia Perlman, Addison-Wesley, 1992, incorporated herein by reference.

Once the topology of the network is learned by all the nodes in the network, routes can be calculated from source to destination users. A routing algorithm that is commonly used to determine the optimum route from a source node to a destination node is the Dijkstra algorithm.

To aid in the understanding of the principles of the present invention, a description of the well known prior art Dijkstra routing algorithm is presented. More detailed information on the Dijkstra algorithm can be found in Section 9.2,4 of the book Interconnections: Bridges and Routers by Radia Perlman, Addison-Wesley, 1992, incorporated herein by reference, In general, the Dijkstra algorithm is used to generate the Designated Transit List that is the routing list used by each node in the path during the setup phase of the call. Used in the algorithm are the topology database (link state database) which includes the PTSEs received from each node, a Path List comprising a list of nodes for which the best path from the source node has been found and a Tentative List comprising a list of nodes that are only possibly the best paths. Once it is determined that a path is in fact the best possible, the node is moved from the Tentative List to the Path List.

Figure 1:
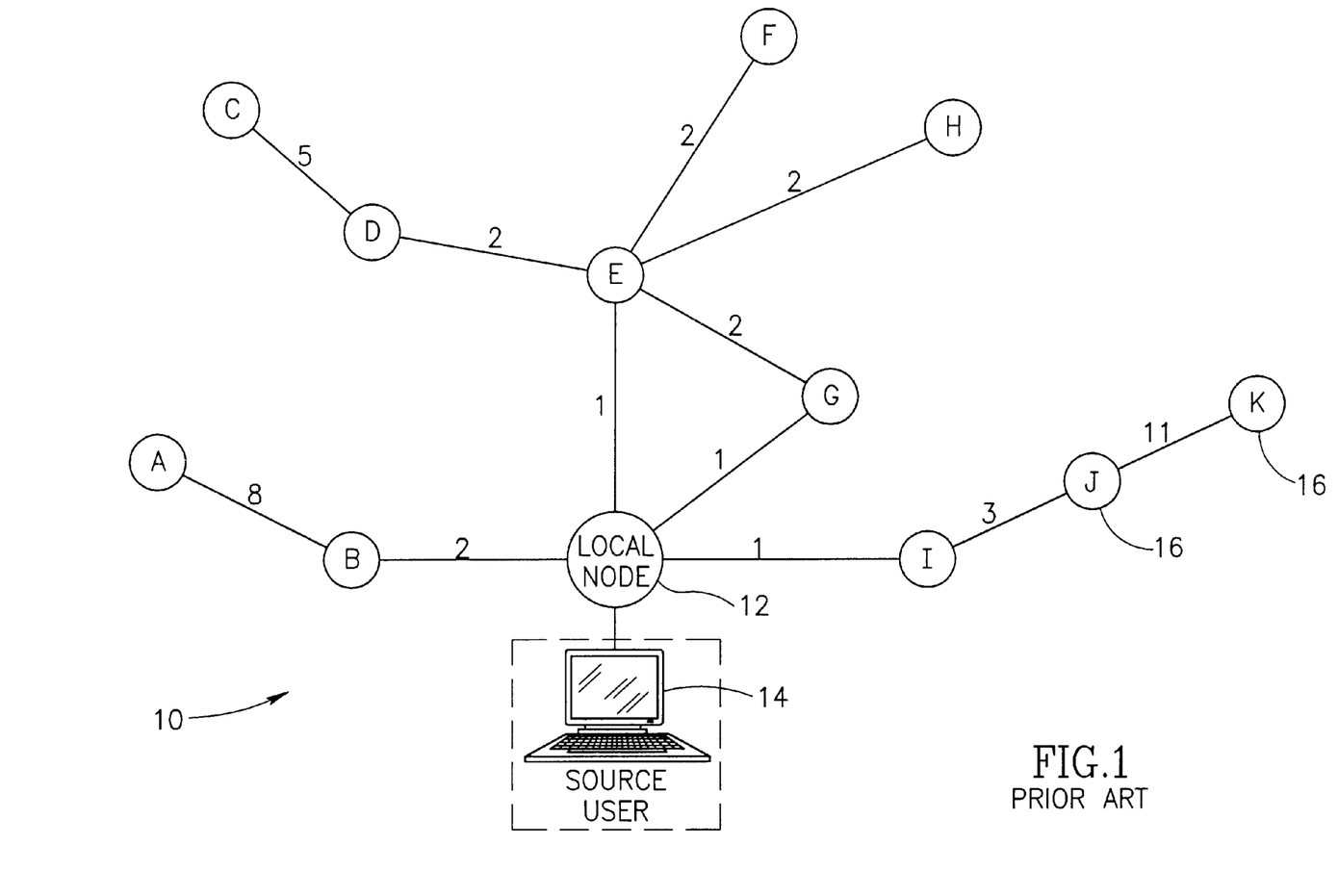
FIG. 1 is a diagram illustrating an example ATM network consisting of a plurality of nodes and a source user connected to a local node.

The description will be presented in the context of an example network for illustration purposes. A diagram illustrating an example ATM network consisting of a plurality of nodes and a source user connected to a local node is shown in FIG. 1. The example network, generally referenced 10, comprises a plurality of nodes 16, each labeled by a different letter. A source user 14 is connected to a local node 12. Nodes are connected via links between them with the link cost represented by a number shown next to each link. Note that the cost of a link corresponds to the links resources, e.g., its capacity. Links with lower costs are preferred over links with higher costs. For purposes of the example presented below, node A is considered the destination node.

The algorithm begins with the source node (self) as the root of a tree by placing the source node ID onto the Path List. Next, for each node N placed in the Path List, examine N's nearest neighbors. For each neighbor M, add the cost of the path from the root to N to the cost of the link from N to M. If M is not already in the Path List or the Tentative List with a better path cost, add M to the Tentative List.

If the Tentative List is empty, the algorithm terminates. Otherwise, the entry in the Tentative List with the minimum cost is found. That entry is moved to the Path List and the examination step described above is repeated.

Figure 2:
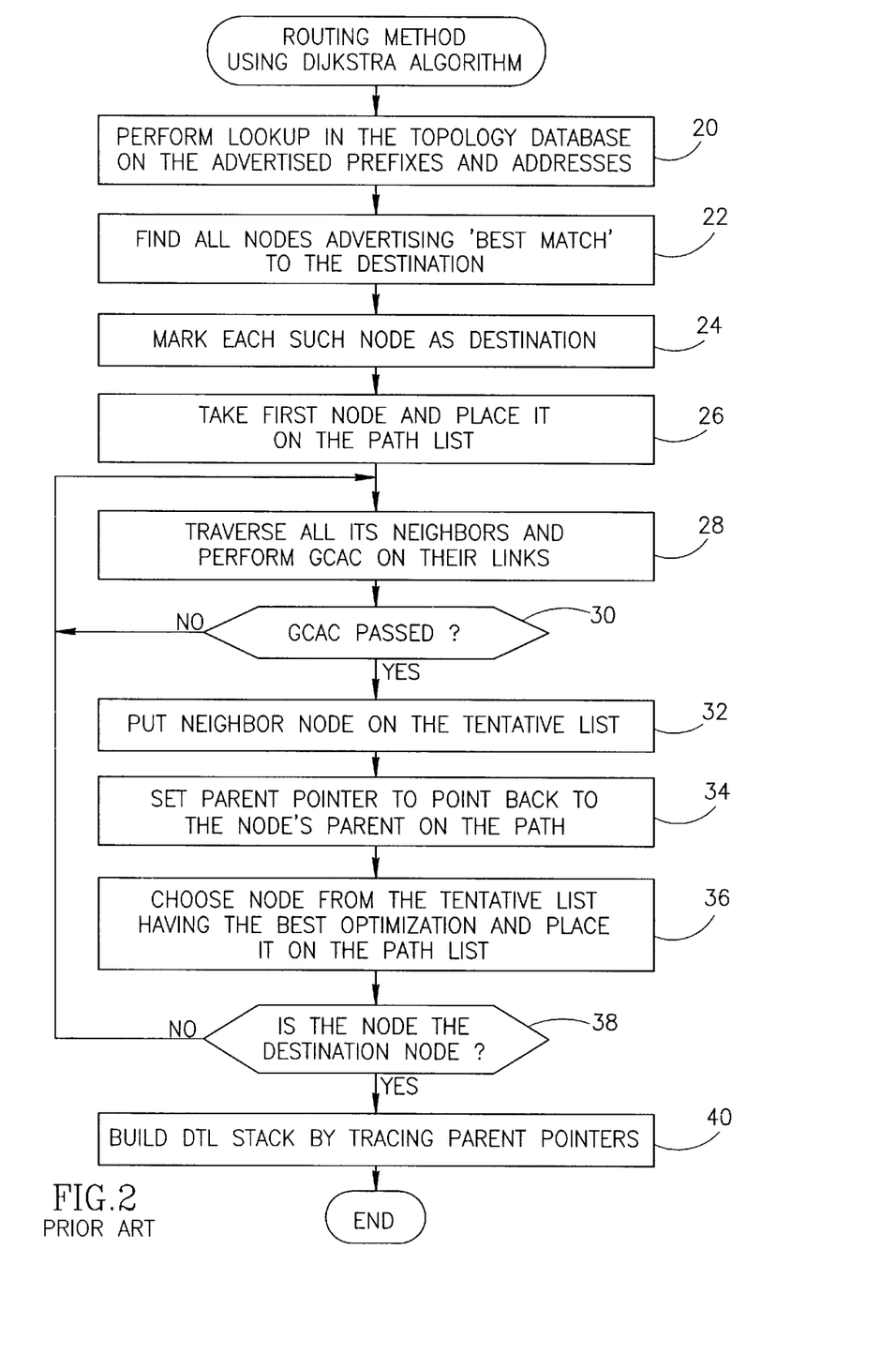
FIG. 2 is a flow diagram illustrating the prior art method of network routing using the well known Dijkstra method.

A flow diagram illustrating the prior art method of network routing using the well known Dijkstra method is shown in FIG. 2. The first step is to perform an address lookup (step 20) in the node's topology database on the advertised reachable prefixes and addresses to find all the nodes that advertise a 'BEST MATCH' to the destination node (step 22). Each of the nodes found in the search is marked as a 'destination' for this particular route calculation (step 24). Note that more than one node can be marked as a destination node.

The calculations begin with the first node, i.e., the local node, which is placed on the PATH list (step 26). All the neighbors of the local node are then traversed wherein a number of metrics is accumulated for each neighbor (step 28). With reference to FIG. 1, the neighbors include nodes B, E, G and I. A Generic Connection Admission Control (GCAC) analysis is performed on the links to the neighbors and if a link passes the GCAC analysis (step 30), the corresponding neighbor is placed on the TENTATIVE tree which is keyed for metric optimization (step 32). In this case, four links corresponding to nodes B, E, G and I are placed on the TENTATIVE list. The parent pointer is then set to point back to the neighbor's parent node along the path, i.e., the node whose links were just evaluated (step 34).

The TENTATIVE list is then sorted by the accumulated link cost as shown below in Table 1.

TABLE I

| Node | Accumulated Cost |
|------|------------------|
| E | 1 |
| G | 1 |
| I | 1 |
| B | 2 |

A node is then chosen from the TENTATIVE list having the best optimization among all the nodes on the TENTA- TIVE list and placed on the PATH list (step 36). It is then checked to see if the node chosen is marked as the destination node (step 38).

If the node is marked as the destination node, a routing list known as a Designation Transit List (DTL) stack, is generated by tracing the parent pointers from the destination node back to the local node (step 40). If the node is not the destination node the method returns to step 28 and the node's neighbors are traversed.

Figure 3:
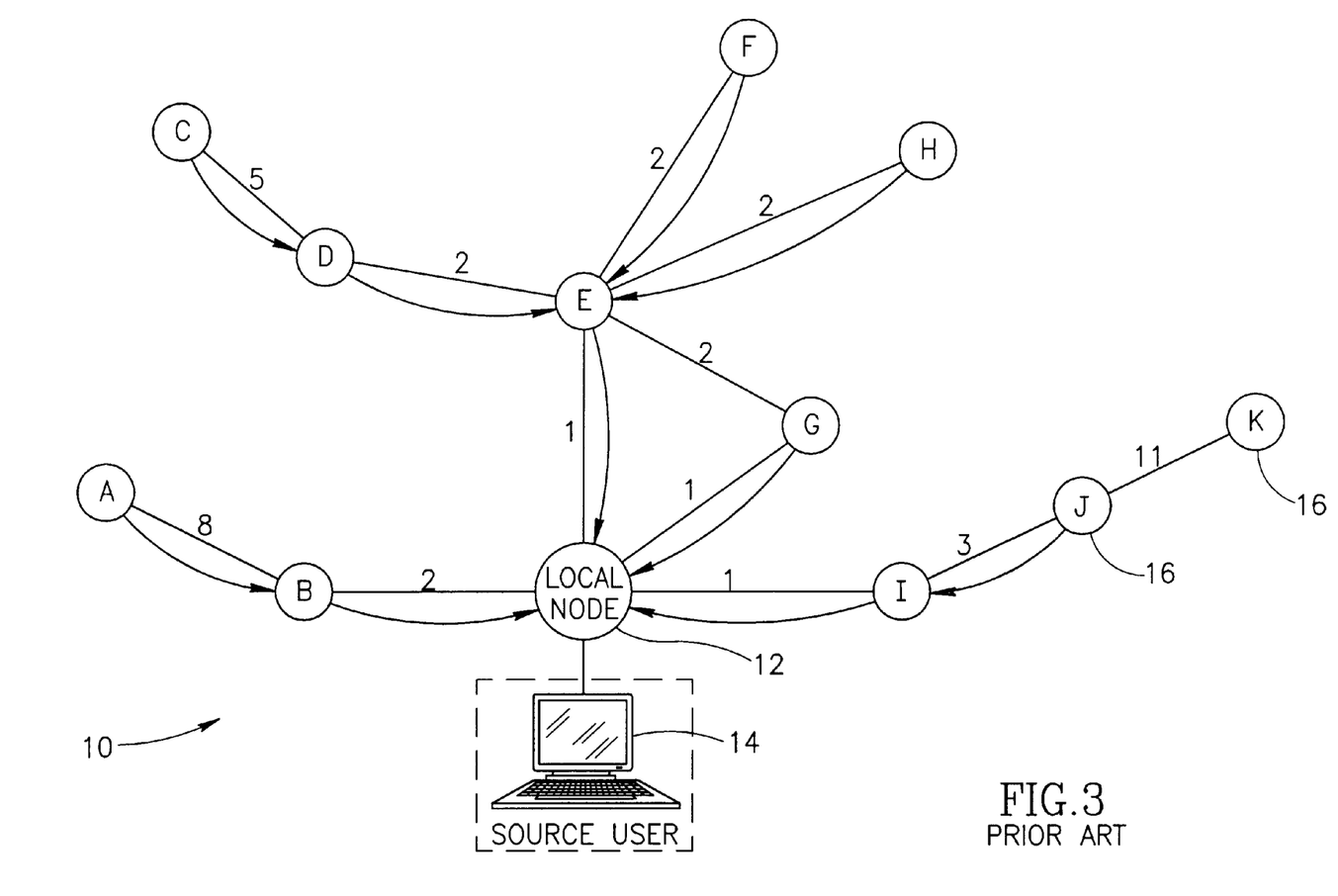
FIG. 3 is a diagram illustrating the example ATM network of FIG. 1 with parent pointers indicated connecting nodes back to the local node.

A diagram illustrating the example ATM network of FIG. 1 with parent pointers indicated connecting nodes back to the local node is shown in FIG. 3. Each node is shown with an allow pointing back to its parent node along the path. For example, assume that node E was randomly selected (note that the cost of nodes E, G, I are identical). Since node E is not the destination. The neighbors of node E are then examined, i.e., nodes D, F, H and G. The accumulated cost back to the local node of each link is then examined. Links having lower cost are selected over those having higher costs. The TENTATIVE list is shown in Table 2 below.

TABLE 2

| Node | Accumulated Cost |
|------|------------------|
| B | 2 |
| D | 3 |
| F | 3 |
| H | 3 |
| G | 1 |
| I | 1 |

The process continues in this fashion until, for some topologies, almost the entire network is traversed as shown in FIG. 3. Ultimately, the destination node A is found and the DTL stack consisting of (local node, B. A) is generated Note that there may be more than one path to a destination node. In this case, the algorithm builds a plurality of DTL stacks, with a final decision being made, for some topologies, after almost all the nodes are traversed. The optimum DTL stack is then chosen after all possible paths to the destination have been uncovered and examined. In this fashion every node in the network and its corresponding links is examined until the optimum path is found.

The routing algorithm described above must be performed in response to a SETUP request from a user. The attached node must perform the route calculations each time, regardless of the destination address. Running a routing algorithm, such as Dijkstra, however, consumes computing resources in terms of memory and processor time. As was seen in the example above, almost the entire network was traversed to generate the DTL stack to the destination node A. If the routes could be cached, the route calculation time and the resource utilization would be greatly reduced.

One approach to implement caching is to store a separate DTL stack for each possible destination This would require an enormous amount of memory and is very wasteful if some destinations are never requested. Alternatively, a separate DTL stack can be saved only for destinations that are actually requested by a user. This too, however requires a large amount of memory that is a limited resource and is already scarce, especially in older generation switches being upgraded to run the current PNNI specifications.

In addition, whenever there is a change in the topology of the network, all the cached routes must be erased, i.e., the cache must be flushed. This is because the previously calculated routes would not reflect the changes in the network topology. Links and nodes may have been added, deleted or changed that make the previously calculated routes obsolete. This requires the cache to be quickly flushed whenever the network topology changes. This by itself can be time consuming and wasteful of processor resources, especially if new route need to be recalculated. Thus, this caching scheme is not suitable for use in PNNI networks.

Example ATM Network Illustrating Routing Inefficiencies in Dijkstra

As described previously, in PNNI networks, each node functions to create information units known as PTSEs whereby the node described itself, its local links, local addresses and local proprietary information. Each node that creates these PTSEs floods them to the rest of the network. Thus, in a stable ATM network, each node attains knowledge of the entire topology of the network by storing these PTSEs in its database. It is important to point out, however, that one or more PTSEs may change and which have not as yet been received by every node in the network as the nodes are in the midst of being flooded. Therefore, it is more accurate to say that each node almost learns about the entire topology of the network When a node needs to route to a destination, it uses its topology database to find the 'best' or optimum route. The route can be calculated either by (1) using a pre-route calculation, i.e., a route that was calculated beforehand or by (2) using a route calculation for a specific destination on demand, with the optional use of caching.

Although it appears that using the first option above improves the routing performance since the routing calculations are performed during idle time, this is not necessarily the case as both topology change events and routing request events may occur at the same time. In this case, the routing calculation will be delayed until all routes to the destination are calculated. This delay can potentially be relatively very large. In addition, performing the signaling request first is not optimal since the routing calculation result may be incorrect.

When performing routing on demand, any suitable routing algorithm may be utilized. Some routing algorithms that can be used include, but are not limited to, Belman-Ford and Dijkstra. The Dijkstra algorithm is preferred for performance reasons wherein the resulting complexity is $O(N^2)$. Other typical routing algorithms operate around a complexity of $O(N^3)$.

A problem, however, associated with the Dijkstra algorithm is that it 'spreads' out from the local node in performing the route calculation like 'fire in a field of thorns.' The algorithm star from the local node A and during each iteration, it expands one hop further from the local node. Since a specific destination was requested, the 'best' node from the TENTATIVE node list is chosen, in accordance with the optimization.

Figure 4:
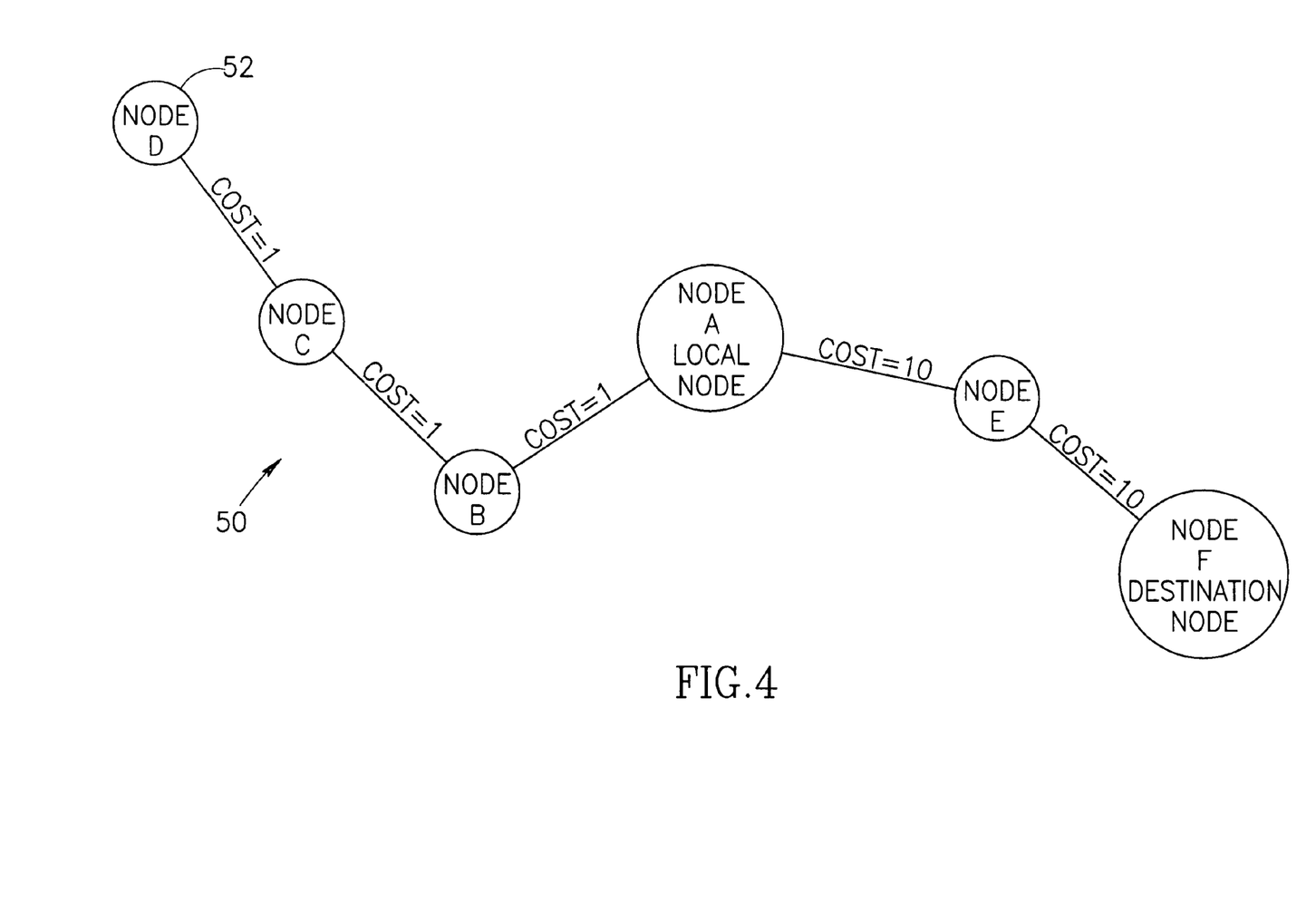
FIG. 4 is a diagram illustrating an example ATM network having a local node and a destination node whereby a route is calculated to the destination using the first method of the present invention.

A diagram illustrating an example ATM network having a local node and a destination node whereby a route is calculated to the destination using the first method of the present invention is shown in FIG. 4. The example ATM network, generally referenced 50, comprises a plurality of nodes 52 represented by different letters. A local node A is connected to neighboring nodes E, F (the destination node), B, C and D. The cost associated with each node is also shown, During the route calculation, the local node chooses the next node to put on PATH without knowledge of whether that node will lead to the destination. Assuming the optimization is performed in accordance with the cost and if the destination node to route to is node F, then the node likely to be put on PATH is node B since the cost of the link is one compared with ten for the link between local node A and node E. The node does not yet 'know' that this path leads to a dead end and will not yield a path to the destination for this specific configuration. In particular, Dijkstra will traverse nodes B, C and D before it realizes that none of these nodes along this path lead to the destination.

Note that the above analysis assumes that the routing is optimized on the link cost (i.e., the smallest accumulated cost).

SUMMARY OF THE INVENTION

The present invention overcomes the problems of the prior art discussed above by providing two solutions for optimizing the algorithm used by the local node in calculating the route to a destination node. A first method optimizes the route calculation by associating a port/link information with the PTSEs received by the node. A second method optimizes the route calculation by utilizing a special PTSE termed a ROUTE_PTSE into which is placed the route the PTSE takes upon being flooded from the creating node. It is important to point out that the first and second method of the present invention is suitable for optimizations that are based on MINIMAL hop count optimizations and is suited only for UBR type calls as no optimizations are performed on cell delay, etc. In addition, a node may support either or both methods. If a node supports both, then if the second method fails, the node can still utilize the first method.

In the first method of the present invention, the originating node generates one or more PTSEs and begins the flooding process by flooding it to all its neighbors. The neighbors receive the PTSE, store it in their topology databases and forward it further on to the network unless that particular PTSE has previously been stored in their topology database. An association is thus made between the originating node and the port/link it was first received on.

At some point in time after the association is made and stored in a local node, a request is received to route to a destination node. If an association has previously been made for that particular destination node, the routing algorithm, e.g., Dijkstra, is altered such that the node begins searching for a route using the associated port/link that the PTSE was previously received on. Thus, in a sense, the routing algorithm is 'steered' or 'pointed' in the optimum direction to start with, thus saving time in determining the optimum route to the destination.

The second method of the present invention requires that each node supporting this method create a new PTSE termed a ROUTE_PTSE that is flooded as usual throughout the network. The PTSE is sent form the originator with a header and an empty body. Each node along the path that supports this second method adds itself to the bottom of the list. In this fashion, a source route is constructed, from the originating node to any other node. If a node does not understand the PTSE, it stores it and floods it further on in accordance with the PNNI standard.

When performing the routing algorithm (Dijkstra) it is checked whether the destination node previously generated a ROUTE_PTSE that would have been stored locally. If none was found, the routing algorithm proceeds as usual. If it is found, the DTL list generated previously and contained in the ROUTE_PTSE is traversed and if no constraints are found is used as the route.

There is provided in accordance with the present invention, in an Asynchronous Transfer Mode (ATM) network, a method of improving the performance of a routing algorithm in calculating a route from a local node to a destination node, the nodes in the network running the Private Network to Network Interface (PNNI) protocol, the method comprising the steps of generating a PNNI Topology State Element (PTSE) on an originating node and flushing the PTSE throughout the network, receiving the PTSE at a local node, associating the originating node with a port link the PTSE arrived on if the PTSE is not in a topology database within the local node or if the PTSE is in the topology database but with a lower sequence number associated thereto, placing a neighbor of the local node associated with the port/link the PTSE arrived on onto a TENTATIVE list, in accordance with a call request, the PTSE received from the originating node currently being the destination and continuing the route calculation in accordance with the routing algorithm.

The method further comprises the steps of placing the remaining neighbors connected to the local node onto the TENTATIVE list if a destination is not found utilizing the port/ink and continuing the route calculation in accordance with the routing algorithm using the TENTATIVE list.

The method further comprises the steps of generating a nodal PTSE upon receipt of a link PTSE indicating that a link has come up or gone down, waiting a period of time, the period of time chosen randomly from a predetermined time range and flooding the PTSE to the network upon the expiration of the random time period.

There is also provided in accordance with the present invention, in an Asynchronous Transfer Mode (ATM) network, a method of improving the performance of a routing algorithm in calculating a route from a local node to a destination node, the nodes in the network running the Private Network to Network Interface (PNNI) protocol, the method comprising the steps of generating a Routing PNNI Topology State Element (ROUTE_PTSE) on an originating node and flushing the ROUTE_PTSE throughout the network, the ROUTE_PTSE including a routing list which is initially empty, receiving the PTSE at a node, adding the node to the routing list if a neighboring node the ROUTE_PTSE was received from is either the originating node or the node most recently added to the routing list, calculating a best route to the last node in the routing list and adding the resulting nodes to the routing list if the neighboring node the ROUTE_PTSE was received from is neither the originating node nor the node most recently added to the routing list, storing the ROUTE_PTSE in a topology database in the node and flooding the ROUTE_PTSE to neighbors of the node, traversing the path on the routing list associated with a destination node, in accordance with a call request, if the ROUTE_PTSE associated with the destination node is found in the topology database of the local node and routing the call in accordance with the routing algorithm using the contents of the routing list.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

The following notation is used throughout this document.

| Term | Definition |
| --- | --- |
| ANSI | American National Standards Institute |
| ATM | Asynchronous Transfer Mode |
| CCITT | Comite Consulatif International Telegraphique et Telephonique |
| DTL | Designation Transit List |
| FDDI | Fiber Distributed Data Interface |
| FSM | Finite State Machine |
| GCAC | Generic Connection Admission Control |
| IISP | Interim Inter-Switch Signaling Protocol |
| ILMI | Interim Local Management Interface |
| ITU | International Telecommunications Union |
| NNI | Network to Network Interface |
| PGL | Peer Group Leader |
| PNNI | Private Network to Network Interface |
| PTSE | PNNI Topology State Element |
| PTSP | PNNI Topology State Packet |
| RCC | Routing Control Channel |
| UBR | Unspecified Bit Rate |
| UNI | User to Network Interface |
| VCC | Virtual Channel Connection |

General Description

The present invention provides two solutions for opt s the algorithm used by the local node in calculating the route to a destination node. A first method optimizes the route calculation by associating a port/link information with the PTSEs received by the node. A second method optimizes the route calculation by utilizing a special PTSE termed a ROUTE_PTSE into which is placed the route the PTSE takes upon being flooded from the creating node. It is important to point out that the first and second method of the present invention is suitable for optimizations that are based on MINIMAL hop count optimizations and is suited only for UBR type calls as no optimizations are performed on cell delay, etc. In addition, a node may support either or both methods. If a node supports both, then if the second method fails, the node can still utilize the first method.

Method #1: Association of Port/Link to PTSE

In the first method of the present invention, the creating node generates one or more PTSEs and begins the flooding process by flooding it to all its neighbors. The neighbors receive the PTSE, store it in their topology databases and forward it further on to the network unless that particular PTSE has previously been stored in their topology database.

Figure 5:
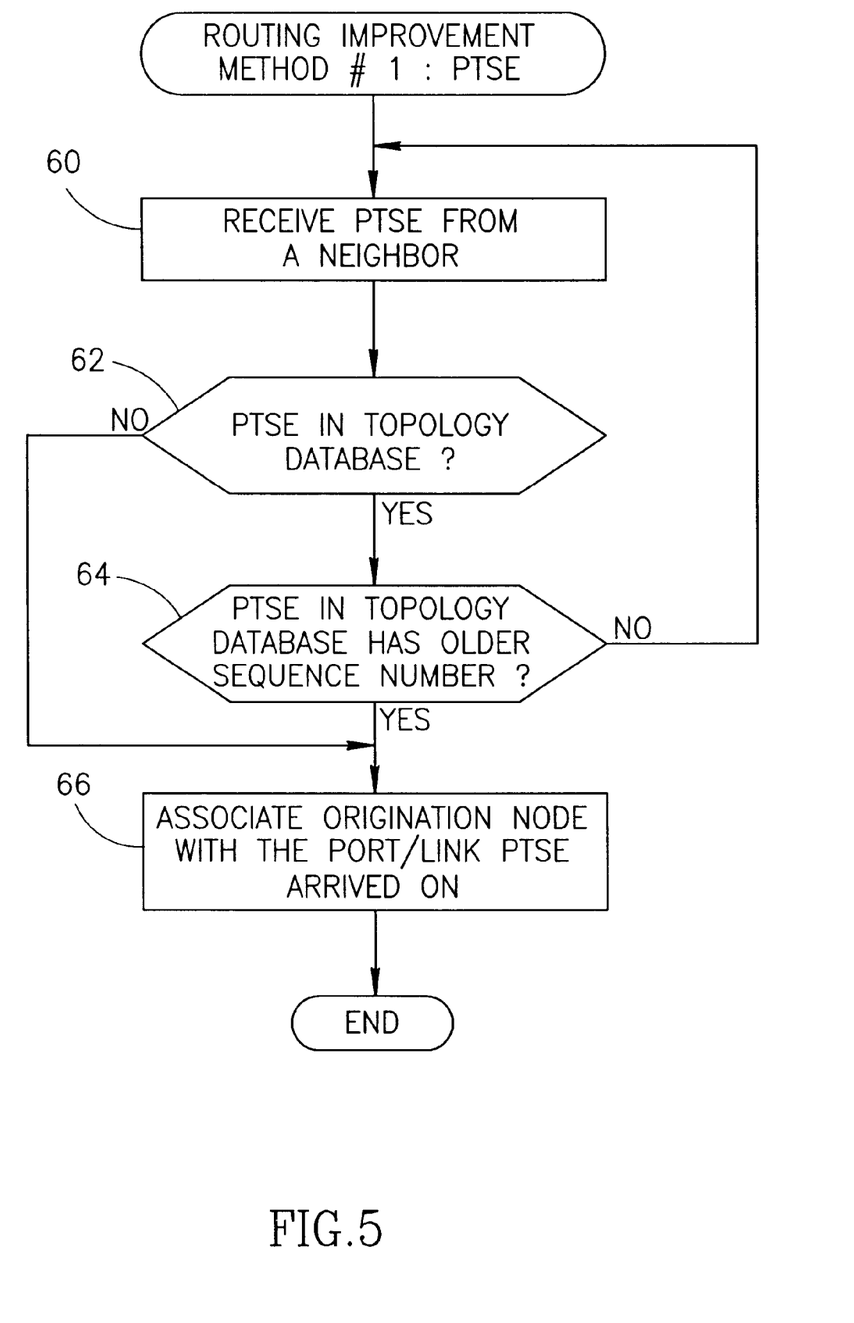
FIG. 5 is a flow diagram illustrating the PTSE portion of a first method of the present invention for improving the performance of the route calculation wherein PTSE information is used to optimize routing.

A flow diagram illustrating the PTSE portion of a first method of the present invention for improving the performance of the route calculation wherein PTSE information is used to optimize routing is shown in FIG. 5. The first step is that a node receives a PTSE from a neighboring node on one of its ports (step 60). When the node receives the PTSE (any PTSE) from its neighbor, it examines who the originator of the PTSE is. It then checks whether that PTSE is already in its topology database (step 62).

If the PTSE is found in the database, the node then checks whether the PTSE in the topology database is older, i.e., has a lower sequence number, than the PTSE just received (step 64). If the PTSE in the topology database does has a lower sequence number or the PTSE is not in the database, than the node associates the originating node wit the port/link the PTSE arrived on (step 66). If it does not, the PTSE is neither stored nor flooded. Note that the originating node is typically not a neighbor of the receiving node. This association is stored in the node's database and is used at a later time when there is a request to perform a route calculation to the originating node.

At some point in time after the association is made and stored in a local node, a request is received to route to a destination node. If an association has previously been made for that particular destination node, the routing algorithm, e.g., Dijkstra, is altered such that the node begins searching for a route using the associated port/link that the PTSE was previously received on. Thus, in a sense, the routing algorithm is 'steered' or 'pointed' in the optimum direction to start with, thus saving time in determining the optimum route to the destination. This is done by putting only that port's neighbor on the TENTATIVE list and if the destination was not found, then the remaining neighbors are put on TENTATIVE.

Figure 6:
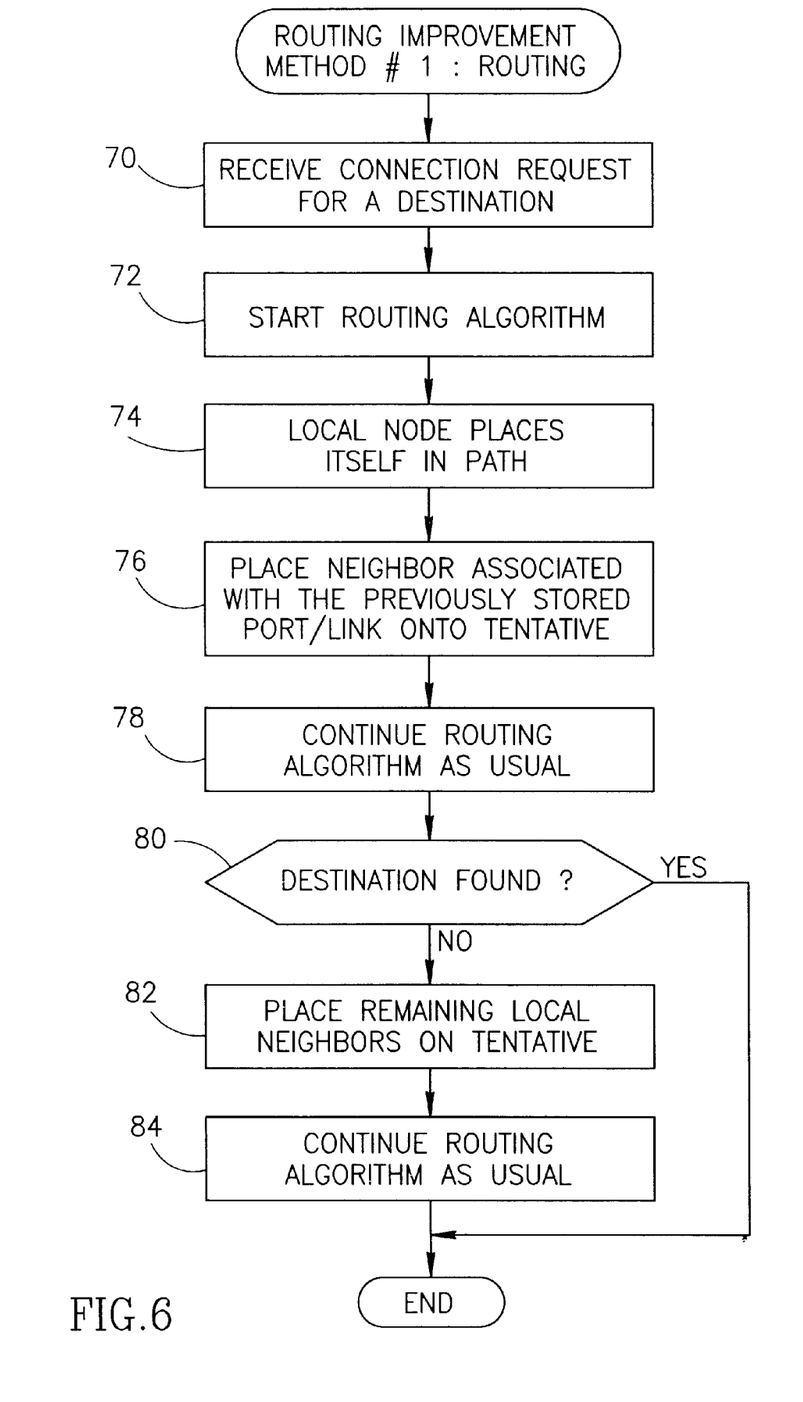
FIG. 6 is a flow diagram illustrating the routing portion of the first method of the present invention for improving the performance of the route calculation.

A flow diagram illustrating the routing portion of the first method of the present invention for improving the performance of the route calculation is shown in FIG. 6. First, a connection request is received from a node to connect to a destination node (step 70). The routing algorithm such as Dijkstra is then started in response to the request (step 72). When the local port begins the routing algorithm, it puts itself in the PATH (step 74). It then traverses its neighbors and puts them on TENTATIVE. In accordance with the first method, however, the local node only puts the neighbor that was previously associated with the destination port on the TENTATIVE list (step 76). The routing algorithm, e.g., Dijkstra, continues as usual in search of the destination node (step 78).

If the destination node is found (step 80), the method terminates. If, however, the destination was not found, the remaining local neighbors are placed on the TENTATIVE list (step 82) and the algorithm continues as usual (step 84). Note that the destination may not be found even if the correct neighbor node, i.e., the node associated with the port/link that the PTSE from the destination (originating) node came in on, was put on TENTATIVE since the GCAC may have failed.

The first method is operative to cause the routing algorithm to start with the port associated with the PTSE received from the destination port because it is assumed that this port is the 'closest' or fastest way to the destination. It is highly probable that the PTSE received first from an originating node took the shortest path therefrom. Thus, the port/link association is made using this first PTSE. Note, however, that the destination may be not reachable using the associated port/link at the time the connection request is received.

In addition, the first PTSE to arrive at a node may not have taken the shortest or optimal route from the originating node. It is possible that there are other ports that can lead to the destination. These ports, however, are probably the same or larger number of hops from the local node. A flood may or may not have been received over these other ports. The port the first flood is received on, however, is assumed to be the 'closest' to the originator.

Even if the port to have received the PTSE flood is not the optimal, all is not lost, as a route to the destination from that particular port/link will still be able to be found even though it is not optimal. An advantage of this is that this provides a form of load sharing as the optimal route is not always taken time after time.

Note also that in accordance with the first method, even if the route fails using the associated port/link from the database (meaning that one of the constraints on the call blocked the path from the associated port) the other remaining ports on the local node can be tried, even if their ultimate hop count to the destination is larger as they might not be blocked by the constraints.

The time saved in finding a route to the destination will vary depending on the location of the local node and the number of ports attached to it.

The first method also comprises a means for speeding up the propagation of changes in the network such as when a link comes up or goes down. In the event a node receives a link PTSE containing information concerning a link coming up or going don the node generates and floods a nodal PTSE advertising itself The node, however, waits a random time within a time range, e.g., 1 to 5 seconds, before transmitting the nodal PTSE to its neighbors. Thus, nodes in the network are updated in a matter of seconds rather than having to wait for the nodal PTSEs to age with the typical aging time being 30 minutes.

Method #2: Construction of a DTL Along the Flooding Path

The second method of the present invention requires that each node supporting this method create a new PTSE, termed a ROUTE_PTSE that is flooded as usual throughout the network. The PTSE is sent from the originator with a header and an empty body. Each node along the path that supports this second method adds itself to the bottom of the list. In this fashion, a source route is constructed from the originating node to any other node. If a node does not understand the PTSE, it stores it and floods it further on in accordance with the PNNI standard.

Figure 7:
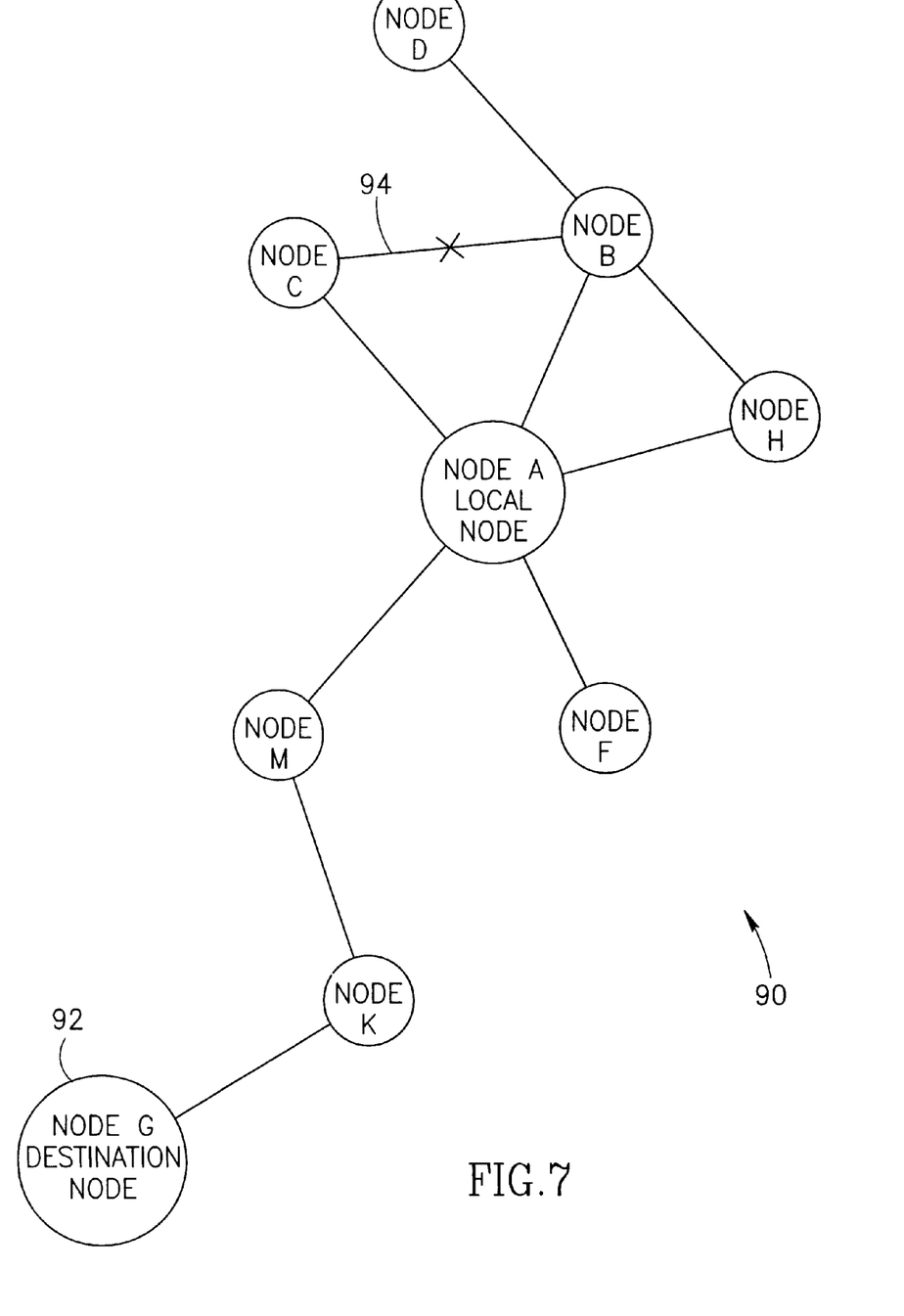
FIG. 7 is a diagram illustrating an example ATM network having a local node and a destination node whereby a route is calculated to the destination using the second method of the invention.

A diagram illustrating an example ATM network having a local node and a destination node whereby a route is calculated to the destination using the second method of the invention is shown in FIG. 7. The example network, generally referenced 90, comprises a plurality of nodes 92 labeled with letters. The local node A is shown connected to nodes M, F, H. B and C. Other nodes include nodes D, K and G (the destination node).

Figure 8:
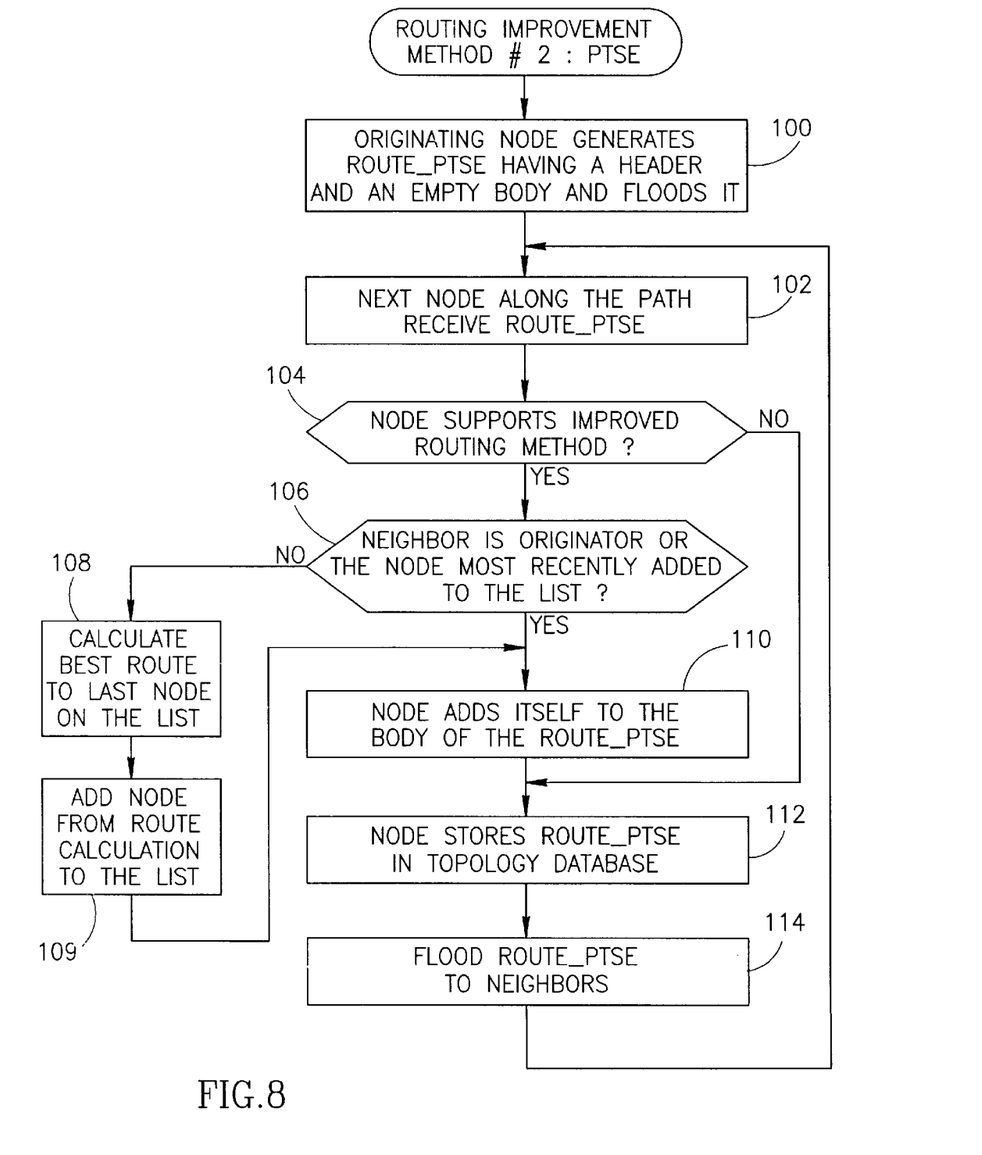
FIG. 8 is a flow diagram illustrating the PTSE portion of a second method of the present invention for improving the performance of the route calculation wherein PTSE information is used to optimize routing.

A flow diagram illustrating the PTSE portion of a second method of the present invention for improving the performance of the route calculation wherein PTSE information is used to optimize routing is shown in FIG. 8. It is important to note that in contrast to the regular PTSE which, according to the PNNI standards, only the originating node can alter, the second method requires that all nodes supporting this feature must alter the PTSE.

With reference to FIGS. 7 and 8, the first step is that the originating node generates and floods the ROUTE_PTSE having a header as usual but with an empty body (step 100). Each node along the path receives the ROUTE_PTSE (step 102). If the node supports the second method (step 104) it checks whether the neighbor that sent the PTSE is the originator or the node most recently added to the list (step 106).

If either case is true then the node adds itself to the body of the ROUTE_PTSE (step 110). Next, the node stores the ROUTE_PTSE in its topology database (step 112) and floods it to its neighbors (step 114). The method continues at the next node on the path (step 102). If the node along the path does not support the second method (step 104), it still stores it in its topology database (step 112) and floods it to its neighbors (step 114).

If neither case is true (step 106), it means that the node's neighbor and maybe additional nodes further upstream do not support this method. In this case, the first node along the path following the one or more nodes that do not support the method must calculate the best route from itself to the latest node added to the list in the received ROUTE_PTSE (step 108). The node then adds the results of the route calculation to the list (step 109), adds itself to the list (step 110), stores the PTSE (step 112) and floods it (step 114).

Thus, for example, the ROUTE_PTSE originated by node G and received at local node A contains a node list similar to a DTL containing in order the following nodes: M, K and G. Each node along the flood path adds itself to the PTSE before flooding it to its neighbors.

When performing the routing algorithm (e.g., Dijkstra) it is checked whether the destination node previously generated a ROUTE_PTSE that would have been stored locally. If none was found, the routing algorithm proceeds as usual.

Figure 9:
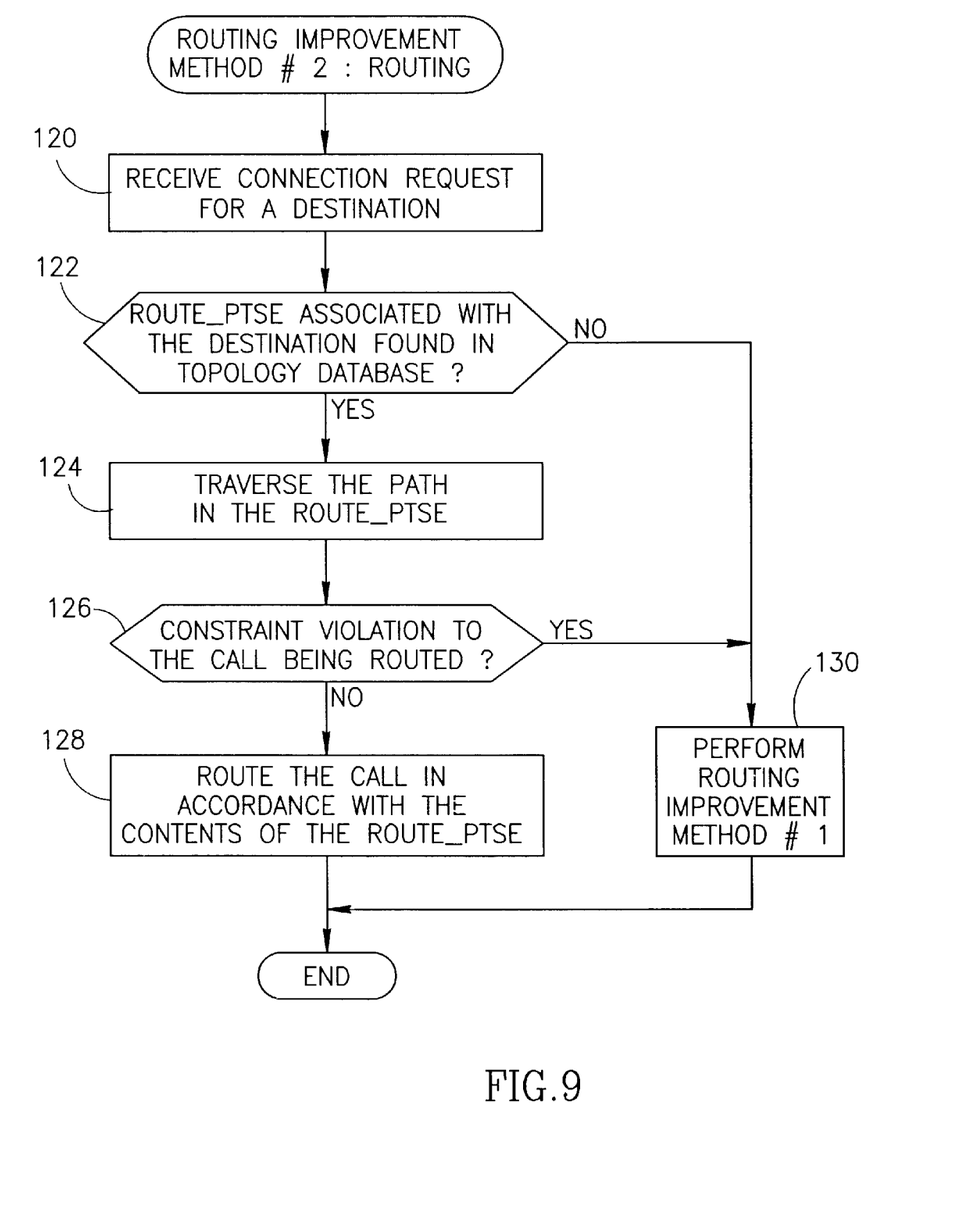
FIG. 9 is a flow diagram illustrating the routing portion of the second method of the present invention for improving the performance of the route calculation.

A flow diagram illustrating the routing portion of the second method of the present invention for improving the performance of the route calculation is shown in FIG. 9. First, the local node receives a connection request for a particular destination (step 120). The node then checks whether the ROUTE PTSE associated with the destination node is in its topology database (step 122). If the node is found in the database, the node then traverses the path found in the previously stored ROUTE_PTSE (step 124).

If a constraint violation is encountered along the path (step 126) or the ROUTE_PTSE was not found in the node's topology database (step 122) then optionally the first routing improvement described hereinabove can be performed (step 130). If no constraints are encountered, the call is routed is accordance with the contents of the ROUTE_PTSE as the optimum DTL already exists (step 128).

With reference to FIG. 7, it may happen that a node comes up but the link, e.g., link 94, goes down. This scenario is not likely but is possible. In this case, the DTL previously generated using the second method is not valid anymore. When the previous originating node is the destination and the local node discovers the link is down while traversing the path (checking GCAC constraints), it must flush the ROUTE_PTSE associated with the originating node. Flushing is accomplished by sending a PTSE with a header having the same sequence number but with a zero lifetime and no data. The receiving nodes, in response thereto, effectively remove the PTSE from their databases.

When the originating node receives the flush PTSE it responds by generating a new ROUTE_PTSE and flooding it to its neighbors. A new DTL is thereby constructed and eventually arrives at the local node but with a DTL that gets around the failed link. Note that until the new ROUTE_PTSE reaches the local node still performs the Dijkstra algorithm as usual without the benefit of the new DTL as the route must be calculated immediately upon receiving the request. Some time after the route is calculated, the new ROUTE_PTSE is received and the topology database in the local node is updated.

While the invention has been described with respect to a limited number of embodiments, it will be appreciated that many variations, modifications and other applications of the invention may be made.

What is claimed is:

1. In an Asynchronous Transfer Mode (ATM) network, a method of improving the performance of a routing algorithm in calculating a route from a local node to a destination node, the nodes in said network running a Private Network to Network Interface (PNNI) protocol, said method comprising the steps of:

generating a PNNI Topology State Element (PTSE) on an originating node and flushing said PTSE throughout said network;

receiving said PTSE at a local node;

associating said originating node with a port/link said PTSE arrived on if said PTSE is not in a topology database within said local node or if said PTSE is in said topology database but with a lower sequence number associated thereto;

placing a neighbor of said local node associated with said port/link said PTSE arrived on onto a TENTATIVE list, in accordance with a call request, said PTSE received from said originating node currently being the destination; and continuing the route calculation in accordance with said routing algorithm.

2. The method according to claim 1, further comprising the steps of:

placing the remaining neighbors connected to said local node onto said TENTATIVE list if a destination is not found utilizing said port/link; and continuing the route calculation in accordance with said routing algorithm using said TENTATIVE list.

3. The method according to claim 1, further comprising the steps of:

generating a nodal PTSE upon receipt of a link PTSE indicating that a link has come up or gone down;

waiting a period of time, said period of time chosen randomly from a predetermined time range; and flooding said PTSE to said network upon the expiration of said random time period.

4. In an Asynchronous Transfer Mode (ATM) network, a method of improving the performance of a routing algorithm in calculating a route from a local node to a destination node, the nodes in said network running a Private Network to Network Interface (PNNI) protocol, said method comprising the steps of:

generating a Routing PNNI Topology State Element (ROUTE_PTSE) on an originating node and flushing said ROUTE_PTSE throughout said network, said ROUTE_PTSE including a routing list which is initially empty;

receiving said ROUTE_PTSE at said local node;

adding said local node to said routing list if a neighboring node said ROUTE_PTSE was received from is either said originating node or a node most recently added to said routing list;

calculating a best route to said node most recently added to said routing list and adding the resulting nodes to said routing list if the neighboring node said ROUTE_PTSE was received from is neither said originating node nor the node most recently added to said routing list;

storing said ROUTE_PTSE in a topology database in said local node and flooding said ROUTE_PTSE to neighbors of said local node;

traversing a path on said routing list associated with said destination node, in accordance with a call request, if said ROUTE_PTSE associated with said destination node is found in said topology database of said local node; and routing said call in accordance with said routing algorithm using the contents of said routing list.

5. The method according to claim 4, further comprising the step of performing the route calculation in accordance with said routing algorithm without using said routing list if one or more constraint violations are encountered for said call.

6. The method according to claim 4, firer comprising the steps of:

flushing said ROUTE_PTSE if one or more down links are encountered while routing said call using said routing list;

generating a new ROUTE_PTSE on said originating node in response thereto; and receiving a new routing at said local node that avoids said one or more down links.

* * * * *